May 16, 1961 P. BRÜNINGHAUS 2,984,622
PROCESS AND DEVICE FOR SCREENING AND FILTERING MOIST GOODS
Filed Aug. 14, 1957 3 Sheets-Sheet 1

INVENTOR:
Paul Brüninghaus
BY Mester and Frey
Armand S. Mester
ATTORNEY

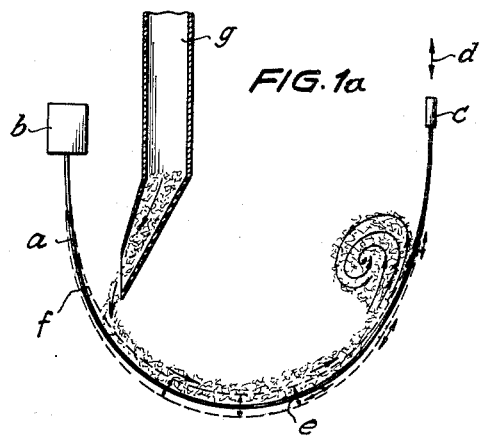
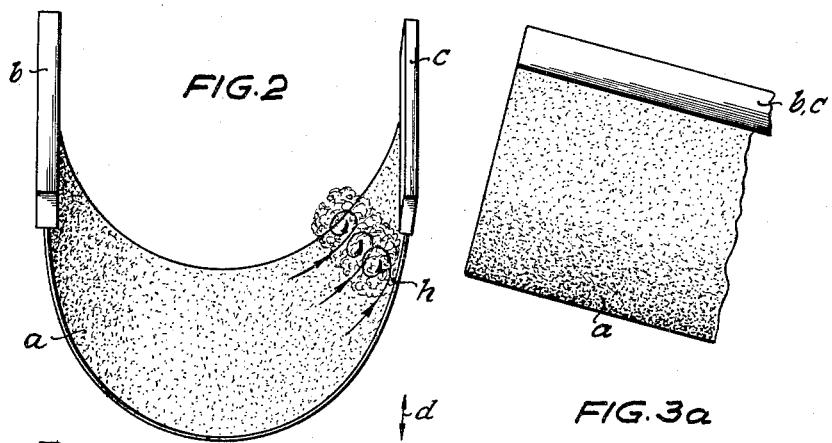
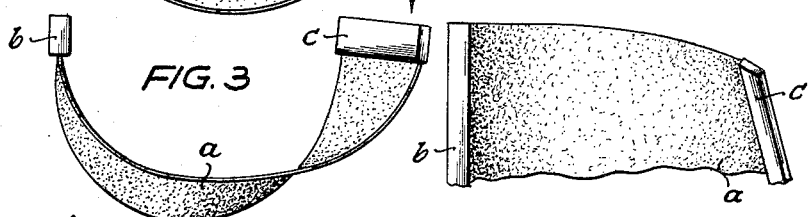
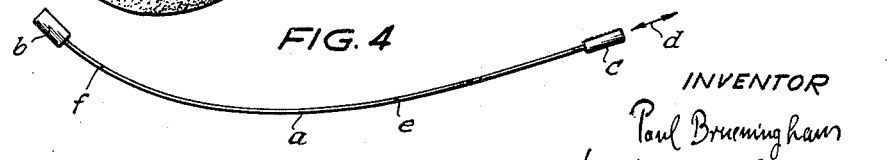

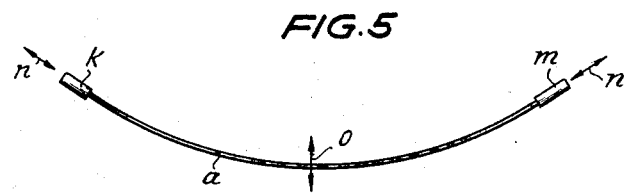
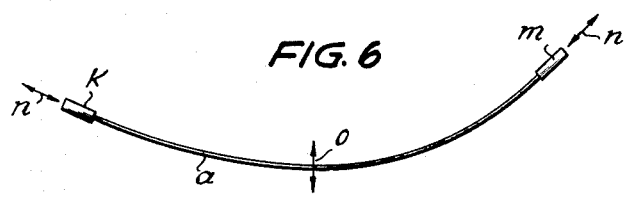

United States Patent Office 2,984,622
Patented May 16, 1961

2,984,622

PROCESS AND DEVICE FOR SCREENING AND FILTERING MOIST GOODS

Paul Brüninghaus, Remscheid-Luettringhausen, Germany, assignor to "Rhewum" Rheinische Werkzeug- und Metallwarenfabrik G.m.b.H., Remscheid-Luettringhausen, Germany Filed Aug. 14, 1957, Ser. No. 678,055

Claims priority, application Germany Apr. 4, 1957

11 Claims. (Cl. 210—19)

It is a known fact that screening and filtering of moist goods, such as sludge, depending on the degree of moisture, causes considerable difficulties. At a certain degree of dilution, all these goods are very hard to screen, if screening is at all possible, due to the fact that the capillary force becomes too strong to be overcome. At the point when this occurs, the doughy mass begins to stick to the web of the screen, with the result that particles are no longer transported and the web becomes entirely clogged.

Certain improvement have been obtained by high frequency oscillation generating transverse oscillations on screen and filter surfaces, the inclination of the surfaces determining the speed of transportation. However, the above described difficulties were not overcome thereby. Even when carried out with these improved means, the goods to be screened, i.e. the moist sludge, due to dehydration reaches a zone where it has a critical moisture content at which it sticks and does not permit any further transportation.

It is the object of the present invention to overcome these difficulties and to solve the problems with which the sewage treatment plants and other filter plants of cities, as well as industrial plants are faced, the problems also involving the recovery of important waste products.

Generally stated, the invention comprises providing a screening or filtering arrangement in which the web of the screening device, which is charged with moist goods, has imparted thereto transverse oscillations with high frequencies reaching into the range of sound, and subsequently and partly overlapping with these oscillations the web has generated therein longitudinal oscillations, likewise of high, partly sonar frequencies.

For carrying out the process according to the invention, the arrangement is made whereby a screening or filtering surface is suspended in the manner of a sagging rope trough being at one end attached immovably, and at the other end free for longitudinal oscillations.

According to one advantageous embodiment, two means of attachments for the ends of the web of the screen are horizontally arranged with two ends of the web fastened thereon, whereas the longitudinal ends sagging between the attached ends are completely free.

In a particularly satisfactory embodiment, one attached end of the screen surface is displaced from parallel position with respect to the other and lies in a different operational plane.

Another variation consists in the arrangement of one or both attached ends being inclined with respect to the horizontal.

With the process according to the invention it is possible to arrive at a far-reaching dehydration and filtration of moist goods in the zone of the transverse oscillations. These oscillations serve essentially for screening, filtering and dehydrating the sludge. The longitudinal oscillations serve for transportation and discharge of the supernatant remainders from the screning zone, the overlapping of the two kinds of oscillations affording a gradual transition.

For carrying out the process of the invention, a sagging web is attached with one end to a horizontal ledge serving as fixed attachment, whereas the opposite end of the screen is attached to another horizontal ledge directly coupled to an oscillation generator or impeller. As known impellers we mention electromagnets, and the like, such impellers being preferred which are capable of generating oscillation reaching with their frequencies into the sonar range. One preferred oscillation impeller is an electromagnet with net frequencies (50 Hz.) and a fundamental oscillation of 100 Hz. superposed by limitation of the amplitude, in a known manner, with high frequency harmonics.

Due to the limitation the longitudinal oscillation obtains an important saw-tooth characteristic.

By means of the oscillation impellers, the web of the screen has oscillations generated therein over its entire surface up to the fixed attachment. At first, longitudinal oscillations are generated at the end where the impeller acts which, as they leave the straightforward direction of propagation, gradually merge into transverse oscillations as they move along over the web surface toward the fixed attachment. As the sagging web is charged with moist goods near the fixed attachment, the goods first travel over a zone of transverse oscillations which cause the known screening and filtering operation.

The supernatant goods at first travel in the direction of gravity toward the lower apex of the sag. In this area, some longitudinal oscillations arrive, which carry off those goods in the direction of the impeller due to their saw-tooth shape. In this transportation, the supernatant goods assume a rolling movement and as they travel along the web they are formed into balls. Simultaneous dehydration is accomplished to a considerable extent.

Dehydration is enhanced by the formation of balls. As this balling up occurs, the so shaped supernatant goods are pushed away laterally towards the edges of the screen by floating goods following the first batch. The dehydrated goods may, therefore, be discharged laterally. The direction of travel of the supernatant goods can be influenced by an angular displacement of the attachment ends of the web with respect to the horizontal.

The supernatant goods travel in the direction of the inclination and in the direction of the oscillations causing transportation toward the impeller. By the overlapping directions of movement, the supernatant goods are oriented toward a definite point of discharge at the frontal face of the web. Another way of orienting the supernatant goods toward a certain discharge point at the frontal edges of the web can be accomplished by twisting the edges of attachment out of a parallel disposition of the two edges of attachment.

In its cross section the screening web corresponds to a sagging rope or trough. The amount of sag may be considerably varied, and it may be adjusted with a view to the screening and filtering intensity and the composition of the moist goods.

In this manner a sludge may be screened and filtered without the supernatant, highly dehydrated goods interfering with the screening and filtering proper, even though the removal of water be very strong. This is due to the fact that the supernatant goods are rapidly carried away and out of the zone of transverse oscillations, by means of the longitudinal oscillations. The screening or filtering surface proper therefore remains free at all times, so that a large amount of moist goods can be charged to the screen without interfering with the screening or filtering function.

According to a very advantageous embodiment of the attachment of the web, such a web which has in its cross-section a sag like a sagging rope, can be suspended at both ends so that it will be capable of receiving longitudinal oscillations. One way of carrying out such an attachment consists therein that the edges of the sagging web are suspended at different levels.

Yet another embodiment is characterized in that the edges of the freely sagging web are twisted with respect to an axis which is tangential to the surface of the web plotted through the center thereof, both edges being twisted in the same direction and at the same angle.

According to still another embodiment, the two edges may be oscillated at different frequencies or with different power.

Due to the movable suspension of a sagging web, in which longitudinal oscillations can be generated from both ends, it is possible to discharge the goods to be screened to both sides with the charging being done in the center of the screening web.

In this embodiment each suspended edge of the web is coupled with a separate oscillation generator or impeller, such generators being preferred which are capable of generating frequencies with harmonics which reach into the sonar range. At the center of the sagging web, transverse oscillations are caused from both sides, which merge into longitudinal oscillations towards the edges of the web. Since the longitudinal oscillations form a wave of transportation, having a direction of propagation oriented toward the edges, the screened goods are discharged at both edges. In this action, the centrally admitted goods to be screened are torn apart with the solid phase being balled up toward the edges during transportation. This results in a particularly good filtration of the charged goods.

By suspending the edges of the freely sagging web at different levels, there will be different inclination at the edges of the web which will permit, as an added advantage to filtration, a separation of the substances present in the charged goods in accordance with their specific gravities. The substances of different gravities travel in different directions due to the different inclinations.

When to this is added the further feature of twisting the edges of the web with respect to a central tangential axis of the web, the direction of discharge of the balled up supernatant goods is defined and fractions can be discharged advantageously in opposite directions.

A particularly advantageous effect is obtained, as mentioned before, by differential impelling actions to the edges, for instance by changing the impelling energy or the frequency.

The process will now be more fully described with reference to the accompanying drawings, but it should be understood that these are given by way of illustration and not of limitation and that many changes in the details can be made without departing from the spirit of the invention.

In the drawings:

Fig. 1a is a diagrammatic showing of the web and attachment, the rims of the web being horizontally aligned.

Fig. 2 shows a sagging screen web with the two attachment rims inclined with respect to the horizontal; Fig. 2a illustrates the same embodiment seen from the side.

Fig. 3 illustrates a horizontally suspended screen web wherein one attachment is twisted with respect to the other attachment; Fig. 3a shows the same embodiment seen from above.

Fig. 4 shows a sagging screen web with reduced sagging.

Fig. 5 is a diagrammatic showing of a screen web actuated from the ends.

Fig. 6 shows a similar arrangement in which the two ends of the screen are attached at different levels.

Fig. 7 is an illustration of a screen net with twisted ends.

Figure 1:
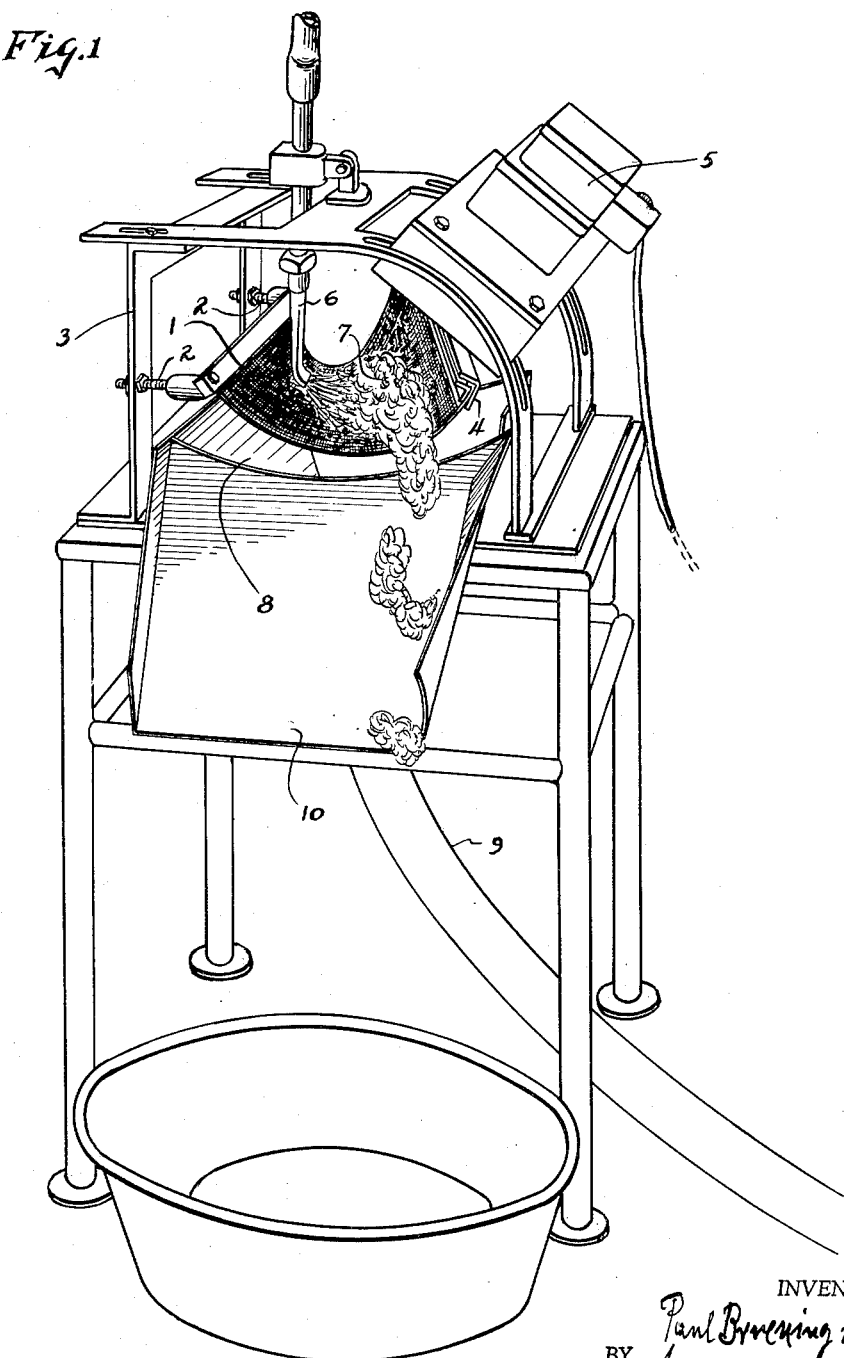
Fig. 1 illustrates an arrangement with suspended sagging screen web in perspective.

Referring now to Fig. 1, a frame 3 of any suitable type is provided to which a screen web designated by 1 is immovably secured at one end by suitable holding means 2. The other end of the web 4 is shown as attached to the oscillating armature of an electromagnet 5 and is movable therewith.

An admission pipe 6 feeds the goods to be screened, which are designated by 7, onto the screening web from which the liquid is drained through a funnel 8 and a hose 9. The solids collect on the web and are discharged by means of an inclined chute 10.

In Figs. 1a-4 the screen web is designated by $a$, the attached end thereof is $b$. The other end of the screen web is connected over the entire length with an impeller $c$.

The impeller $c$ generates fundamental oscillations $d$, which are preferably superposed with harmonics of higher frequency reaching far into the range of sound. These oscillations $d$ are transferred to the screen web along the surface and they consist up to the point $e$ mainly of longitudinal oscillations. Due to the sagging of the web and the change in direction of the parallel surface of the web caused thereby, with respect to the impeller oscillations, from $e$ on to point $f$, mainly transverse oscillations will occur.

The transverse oscillations serve primarily for screening and filtering, the longitudinal waves serve primarily as means of transportation.

When moist goods are charged through funnel $g$ onto the screen in the area of the transverse oscillations, an intensive screening and filtering action occurs in this area, whereas the goods remaining on the surface travel along the screen surface to the lower apex of the sagging screen due to gravity. In this area, longitudinal and transversal oscillation overlap and there will occur a transportation of the goods at the surface in the direction toward the impeller due to the saw tooth shape of the transport waves.

The supernatant goods form a ball in the area of the longitudinal waves and are pushed aside by the oncoming goods of a new charge.

In Fig. 2 the ball-shaped supernatant goods are shown as traveling in the range of the longitudinal oscillations in the angular direction overlapping with the direction of the transport oscillations and tending to reach a predetermined point $h$ at the frontal end of the screen web.

In Fig. 3 the end of the screen attached to the impeller $c$ is twisted out of a parallel direction with respect to the attachment to the stationary ledge $b$. According to the degree of twisting, the travel of the supernatant goods can be directed to any desired point at the front ends of the screen.

As shown in Fig. 4, the degree of sagging can be changed according to the requirements depending on the degree of screening or filtering and to the nature of the goods to be screened. The effect remains the same, that is to say, in this case, a zone of transverse oscillations prevails between points $e$ and $f$, and a zone of longitudinal transport waves between $e$ and $c$.

According to Fig. 5 the web $a$ is clamped with its ends in movable ledges $k$ and $m$ which can be oscillated by conventional oscillators. When oscillation is caused at the ends in the direction shown by the arrows $n$, oscillations are caused in the center of the web as shown by arrow $o$; these oscillations have a double amplitude as compared to the amplitude of the transverse oscillations, generated at one end only; consequently the effectiveness is considerably increased.

Fig. 6 shows a similar suspension of a web $a$ with the difference that the ledge $k$ lies at a lower level than ledge $m$.

Oscillation is brought about again from both ends in the direction of arrows $n$ causing transverse oscillations in the direction of arrow $o$ in the center of the web, which merge into longitudinal oscillations at the ends.

In Fig. 7 the ends of the web are shown twisted with respect to the center axis at equal angles and equal direction, the impellers for generating the oscillations being designated by $p$.

What I claim is:

1. In a filter, a generally stationary frame, a length of filter medium on the frame, means on the frame for supporting the medium by its opposite ends with a perceptible sag in its intermediate area and with its end areas extending away therefrom to the opposite ends, and a vibration generating device on the frame constructed to generate vibrations in a defined plane, said device being attached to at least one end of the medium and disposed so that the defined plane of the vibrations generated thereby will be generally in the same plane as the general plane of the adjacent end area of the medium and along the length of the medium.

2. The structure of claim 1 further characterized in that the medium is flexible, and further including two such vibration generating devices on the frame, one attached to each end of the medium to generate vibrations in the same plane as the general plane of the adjacent end area.

3. The structure of claim 1 further characterized in that one of the ends of the filter medium is somewhat out of parallel with the other end.

4. The structure of claim 1 further characterized in that the length of filter medium is generally rectangular, when flat, with the short sides constituting the opposite ends.

5. The structure of claim 1 further characterized in that the opposite ends of the medium are inclined to the horizontal, both in the same direction, so that the trough defined by the sag in the intermediate area runs downhill from one side edge to tthe other.

6. The method of claim 1 further characterized in that both ends of the filter medium are above the general level of the sag in the intermediate area.

7. A method of filtering moist material, including the steps of positioning a length of flexible screen mesh in an inclined position sagging along the length thereof, imparting vibrations to one end of the mesh in a direction generally in the plane of the said one end of the mesh and along the length of the mesh while allowing the mesh to freely vibrate in between the ends in an unconfined otherwise free state to thereby create transportation vibrations in an area of the mesh at and adjacent the one end and filtering vibrations primarily normal to the plane of the mesh in an area somewhat remote from the said one end and generally in the free sagging portion thereof, feeding moist material to the upper surface of the mesh while it is being so vibrated, and separately withdrawing material from both the top and bottom of the mesh.

8. The method of claim 7 further characterized by the step of supporting opposite ends of the mesh with sufficient slack between the thus supported ends such that both supported ends will be above the general level of the sagging portion thereof.

9. The method of claim 7 further characterized by the step of supporting opposite ends of the mesh with sufficient slack between the thus supported ends such that both supported ends will be above the general level of the sagging portion thereof.

10. A method of filtering moist material, including the steps of supporting a section of flexible filter medium by two opposite ends thereof, positioning the thus supported ends closer to each other than the normal flat length of the filter medium between the said two opposite ends to thereby create a sag in an area of the filter medium intermediate the thus supported ends, imparting vibrations to at least one of the thus supported ends in a direction generally in the plane of the adjacent end area of the said one end and generally at right angles to the said one end, feeding moist material to the upper surface of the medium, and separately withdrawing material from both the top and bottom of the medium.

11. The method of claim 10 further characterized by and including the step of withdrawing material from the upper surface of the medium over one side edge thereof.

References Cited in the file of this patent

UNITED STATES PATENTS

| | | |
|---|---|---|
| 2,251,909 | Lindsay | Aug. 12, 1941 |
| 2,505,513 | Young | Apr. 25, 1950 |
| 2,799,398 | Heymann | July 16, 1957 |

FOREIGN PATENTS

| | | |
|---|---|---|
| 2,510 | Great Britain | Dec. 10, 1892 |
| 13,441 | Great Britain | Aug. 17, 1895 |
| 12,377 | Great Britain | Apr. 25, 1896 |
| 198,756 | Great Britain | June 6, 1923 |
| 168,053 | Germany | Feb. 19, 1906 |
| 1,111,149 | France | Oct. 26, 1955 |